US005199822A

United States Patent [19]

Rogers

[11] Patent Number: 5,199,822

[45] Date of Patent: Apr. 6, 1993

[54] METHOD FOR FILLING LAND AREAS WITH A MATERIAL COMPRISING SOIL AND SPENT LIME

[76] Inventor: Robert V. Rogers, 8177 Crawford, Washington, Mich. 48094

[21] Appl. No.: 823,988

[22] Filed: Jan. 22, 1992

[51] Int. Cl.⁵ ............................................. C09K 17/00

[52] U.S. Cl. .................................... 405/263; 405/128; 405/266; 405/270; 106/793; 106/900

[58] Field of Search ............... 405/128, 129, 263, 264, 405/266, 270; 106/793, 800, 900; 210/702, 747

[56] References Cited

U.S. PATENT DOCUMENTS

| | | | |
|---|---|---|---|
| 2,815,294 | 12/1957 | Havelin et al. | 106/706 |
| 3,526,172 | 9/1970 | Stuart | 405/263 X |
| 3,793,841 | 2/1974 | Dozsa | 405/263 |
| 3,950,179 | 4/1976 | Schneider | 405/263 X |
| 3,966,431 | 6/1976 | Craig et al. | 110/342 X |
| 4,022,633 | 5/1977 | Schneider | 405/264 X |
| 4,134,862 | 1/1979 | Eden et al. | 405/264 X |
| 4,373,958 | 2/1983 | Jones et al. | 106/118 |
| 4,424,076 | 1/1984 | Reed | 405/264 X |
| 4,425,167 | 1/1984 | Bruhn | 405/264 X |
| 4,464,200 | 8/1984 | Duval | 405/266 X |
| 4,849,128 | 7/1989 | Timmons et al. | 210/702 X |
| 4,889,640 | 12/1989 | Stanforth | 405/129 X |

FOREIGN PATENT DOCUMENTS

| | | | |
|---|---|---|---|
| 138778 | 8/1983 | Japan | 405/266 |

*Primary Examiner*—Dennis L. Taylor
*Assistant Examiner*—Arlen L. Olsen
*Attorney, Agent, or Firm*—Reising, Ethington, Barnard, Perry & Milton

[57] ABSTRACT

A composite fill material (22) comprising soil (18) and spent lime (14) and a method for filling depressed land areas (24) therewith. The method for filling land areas (24) includes generating spent lime (14) by adding lime to water (12) in order to precipitate out minerals causing water hardness. The generated spent lime (14) is mixed with soil (18) to form a composite fill material (22) which is subsequently utilized to fill depressed land areas (24) thus creating a solid soil base.

8 Claims, 2 Drawing Sheets

GENERATING SPENT LIME

TESTING SPENT LIME FOR HAZARDOUS MATERIALS

COLLECTING WET SPENT LIME

TRANSPORTING SPENT LIME TO LAND SITE

INTERMIXING SPENT LIME WITH SOIL

FILLING LAND AREA WITH COMPOSITE MATERIAL

METHOD FOR FILLING LAND AREAS WITH A MATERIAL COMPRISING SOIL AND SPENT LIME

BACKGROUND OF THE INVENTION

1. Technical Field

The subject invention is directed toward methods for filling depressed land areas with backfill material.

2. Description of the Related Art

Previously unusable land areas such as gravel pits and excavation sites can often be put to beneficial use once backfilled with fill material. For example, once filled, such land sites have been used for golf courses, public parks, camp grounds and the like. Fill material commonly used for filling such land sites has traditionally included sand, clay, gravel, and broken concrete or bricks. Although such fill material is relatively inexpensive, the resulting load bearing characteristics are often quite marginal.

Soil stabilization techniques have long existed which produce superior load bearing characteristics. These techniques typically involve using a hdyratable form of lime intermixed with other materials to form a concrete-like base. Such hydratable forms of lime draw moisture from the surrounding soil to form a dry solid soil base on which construction may take place. Examples of such techniques are disclosed in U.S. Pat. No. 2,815,294 to Havelin and 4,373,958 to Jones.

The two hdyratable forms of lime typically used include quick lime, CaO, and slaked lime, $Ca(OH)_2$. While yielding superior load bearing characteristics, both forms of lime have significant disadvantages. For example, slaked lime produces a great deal of dust while being intermixed with surrounding soil. Consequently, workers and the surrounding environment are exposed to lime dust. Even more problematic is the caustic properties associated with quick lime which make the handling and spreading of quick lime especially difficult. Additionally discouraging is the cost of obtaining both of these hdyratable forms of lime.

Some of the drawbacks associated with the use of hydratable limes have been mitigated by the use of specially developed spreading techniques, as shown in U.S. Pat. No. 3,793,841 to Dozsa. Also, the use of polymeric additives in conjunction with hdyratable lime has been used, as shown in U.S. Pat. No. 4,134,862 to Eden.

The use of Portland cement as a fill material is also quite common. As with the hydratable lime materials, use of portland cement also relies upon the absorption of moisture from the surrounding soil to dry out wet unstable soil and form a solid base for supporting construction. U.S. Pat. No. 4,464,200 to Duval is illustrative of the use of portland cement.

SUMMARY OF THE INVENTION AND ADVANTAGES

The present invention is directed toward a composite fill material and method for filling land areas therewith. The subject method includes the following steps: generating spent lime which will not absorb an appreciable amount of water, intermixing the spent lime with soil to form a composite fill material, and filling a land area with the composite fill material to create a solid soil base.

An advantage of using spent lime in the subject method is realised by substantial cost savings by reducing the cost of the fill material.

Another advantage of using spent lime in the subject method is the elimination of dust problems associated with prior art backfill materials.

Still another advantage of using spent lime in the subject method is the increased load bearing characteristics of the resulting fill material over typically used fill materials including native soil.

Yet another advantage of using spent lime is the efficient and effective use of otherwise unusable spent lime.

BRIEF DESCRIPTION OF THE DRAWINGS

Other advantages of the subject invention will be readily appreciated as the same becomes better understood by reference to the following detailed description when considered in connection with the accompanying drawings wherein.

DETAILED DESCRIPTION OF THE PREFERRED EMBODIMENT

Figure 1:
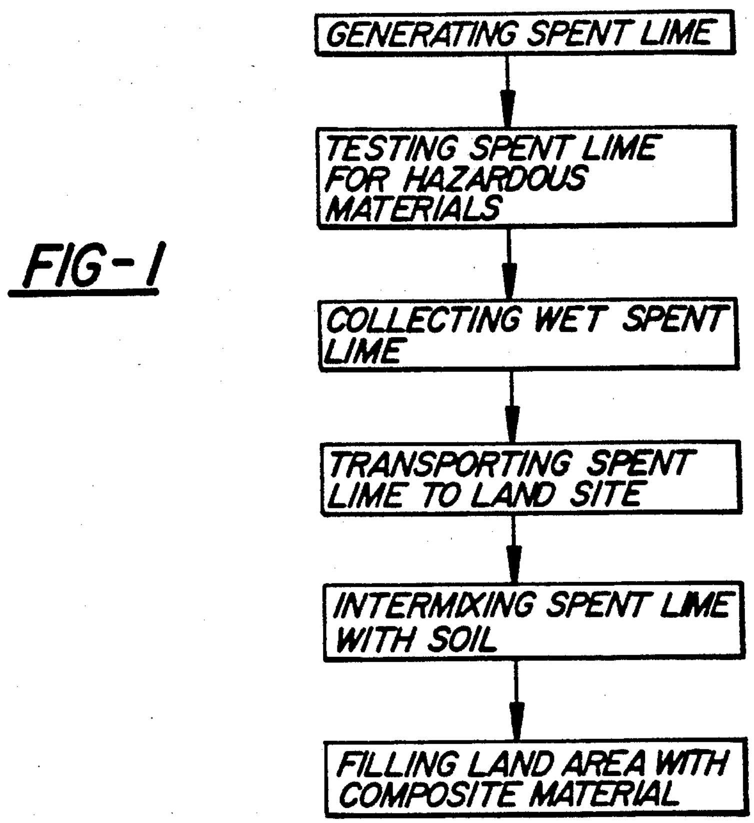
FIG. 1 is a flow chart summarizing the general steps of the subject method.

As an initial overview to the subject method, FIG. 1 has been included in the form of a flow chart showing the major steps involved. Each of the major steps shown in FIG. 1 will be discussed in more detail subsequently. By way of introduction, however, the subject method is a method for filing land areas and includes the general steps of; generating spent lime which will not absorb an appreciable amount of water, intermixing the spent lime with soil to form a composite fill material, and filing a land area with the composite fill material to create a solid soil base.

As indicated in FIG. 1, the first step of the subject method involves generating spent lime. In general terms, the spent lime is generated by adding lime to water in order to precipitate out minerals which cause water hardness. More specifically, lime, CaO, is commonly used in large scale water treatment processes to soften water by precipitating out minerals causing water hardness. Calcium is the primary mineral contributing to water hardness but other minerals such as magnesium and iron also contribute to lesser extents. In practice, water treatment facilities acquire unsoftened water from groundwater or surface water sources. Lime is subsequently added to the unsoftened water to react with the water hardening minerals found therein and form insoluble precipitates therewith. These insoluble precipitates form a residue which is removed from the softened water and stored in nearby settling ponds. Overtime, the insoluble precipitates settle out and form a layer upon the bottom of the pond. The insoluble precipitates, hereinafter referred to as spent lime, are substantially comprised of calcium carbonate (at least half by weight). Unlike quick lime, CaO or slaked lime, $Ca(OH)_2$, spent lime will not react or absorb an appreciable amount of water. Usually, the spent lime comprises approximately 90% calcium carbonate, $CaCO_3$, with the remaining 10% comprising magnesium hydroxide, $Mg(OH)_2$, and other insoluble salts; however, the relative proportions of each constituent of the spent lime vary with the unique geological and environmental surroundings the water has previously been exposed to. Overtime, the spent lime builds up in the bottom of the settling ponds and must be removed and disposed therefrom.

As a precautionary step, samples of the spent lime should by analyzed for unacceptable amounts of hazardous materials such as; silver, barium, mercury, phosphorous, zinc, copper, and depending upon the water source, possibly organic molecules including PCBs. Acceptable levels for these and other hazardous materials may be regionally determined. The State DNR or other governmental agencies may be of assistance in determining acceptable levels of these and other materials. By conducting precautionary analytical testing of the spent lime, the safety of the resulting composite fill and surrounding land area can be assured.

Figure 2:
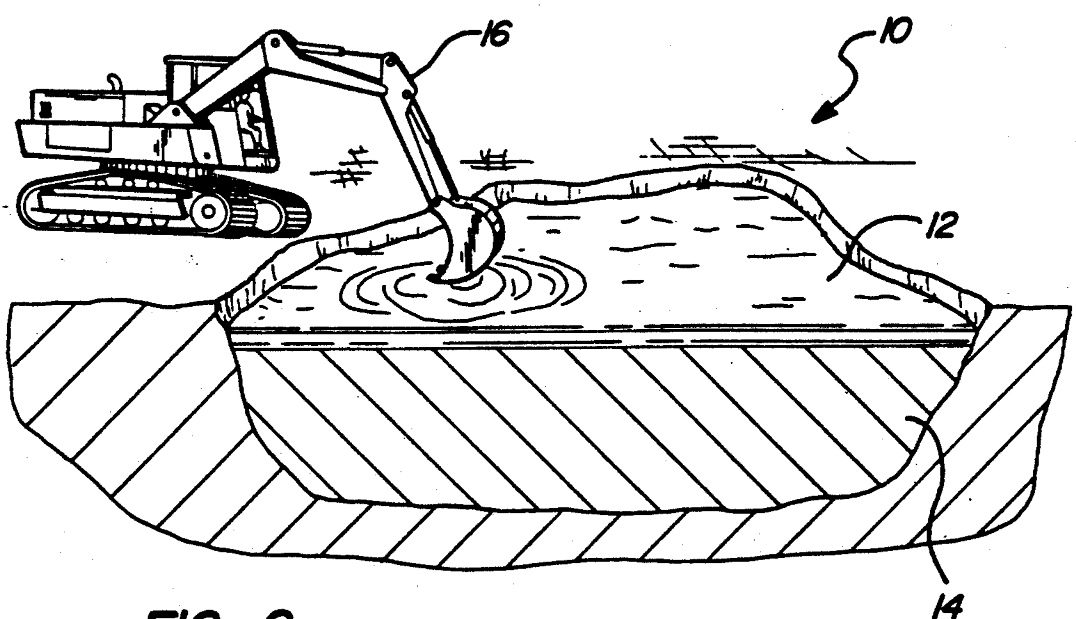
FIG. 2 is a perspective view of a settling pond showing the wet spent lime being removed therefrom.

The spent lime used in the composite fill material and in the subject method is preferably collected from water softening facilities by draining the water from the settling ponds, leaving behind a slurry-like mixture consisting of roughly 60% spent lime and 40% water, hereinafter referred to as wet spent lime. The wet spent lime is typically removed from settling ponds, as shown in FIG. 2. More specifically, the settling pond, generally shown at 10, is drained leaving behind only a limited amount of water 12. Beneath the water 12, lies a layer of wet spent lime 14. The wet spent lime 14 is removed from the pond by the use of a back hoe 16 or like equipment.

Once removed from the settling pond 10, the wet spent lime 14 is transported, preferably by truck, to the selected land site where it is intermixed with soil to form a composite fill material. The soil used to form the composite fill may be native soil found about the land site, however, to obtain optimum results, the soil should comprise a large portion of sand. Ideally, the soil comprises bankrun sand. If the native soil does not contain a large portion of sand, i.e. the native soil is primarily clay, gravel, or silt, sand from a non-native source may be transported to the land site and may be substituted for native soil.

Figure 3:
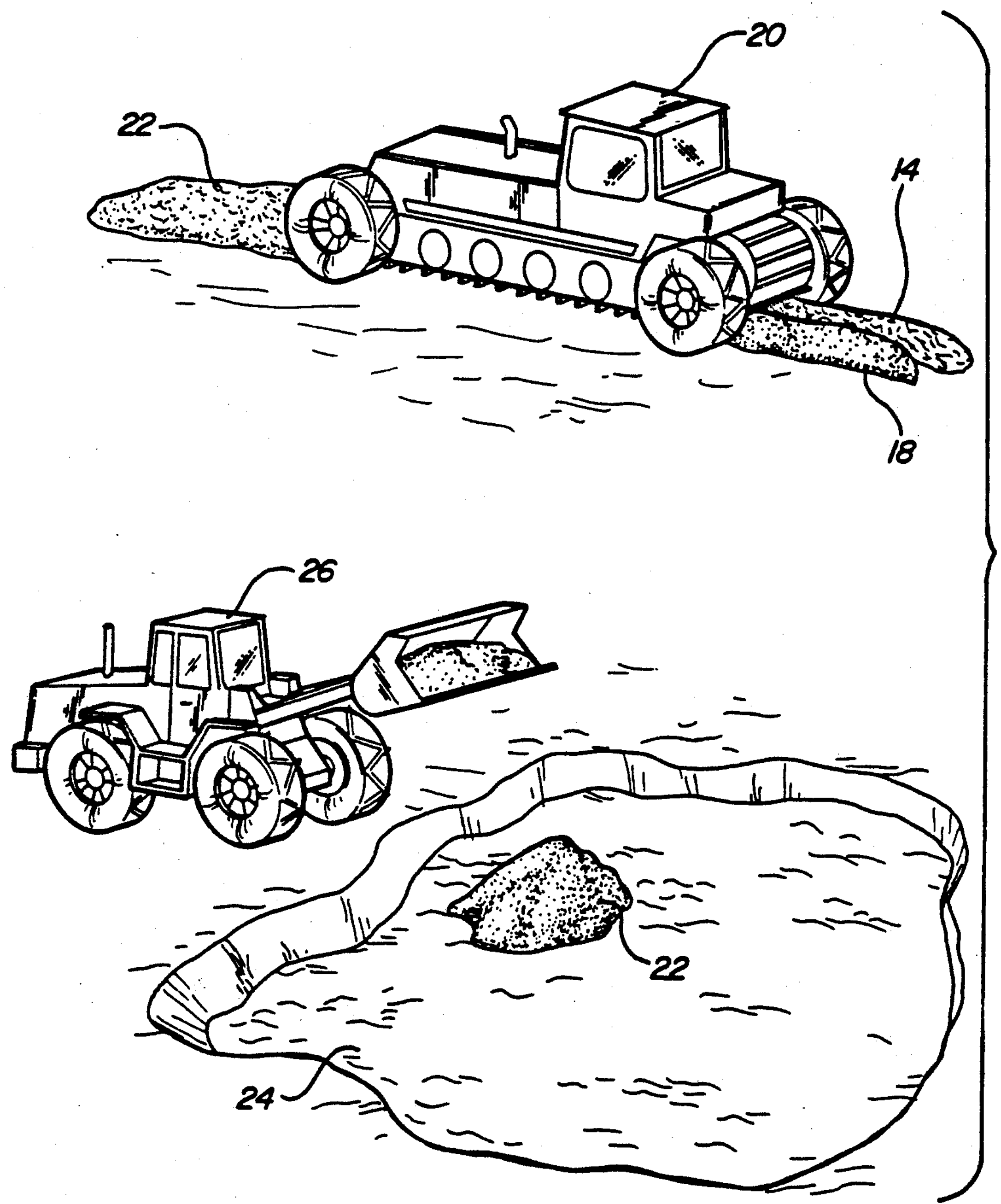
FIG. 3 is a perspective view showing the intermixing of the wet spent lime with soil and the subsequent placement of the composite mixture into a depressed land area.

The wet spent lime 14 and soil are preferably intermixed at a location adjacent the area to be filled. Although many techniques can be used to intermix the wet spent lime 14 and soil, one particular technique has been found to work especially well. The preferred technique is shown in FIG. 3 and involves dumping the wet spent lime 14 in a long narrow mound or row. The soil 18 is likewise dumped in a long narrow mound or row, parallel to the wet spent lime mound located a few feet away. Subsequently, a mixing machine 20, typically used for composting applications, is used to intermix the row of spent lime 14 with soil 18. Several passes over the parallel rows may be required to properly mix the wet spent lime 14 with the soil 20, depending of course, upon the relative proportions of soil to spent lime being mixed. It is important to note that the spent lime 14 being intermixed with the soil 18 is wet and accordingly, generates substantially no dust during the mixing process. Due to the moisture content of the wet spent lime 14, the soil 18 intermixes therewith relatively quickly and easily forming a dense, composite fill material 22. The resulting fill material 22 preferably includes roughly 15% moisture, which maintains ideal compacting characteristics. The moisture content of the composite fill 22 is preferably monitored on site by the use of nuclear density meters, or other like apparatuses commonly used for measuring moisture content of soils. The remaining 85% of the composite fill material 22 comprises soil and spent lime. The ratio of soil to spent lime in the composite fill may vary drastically depending upon the requirements of the fill material, the nature of the surrounding land area, the quantity of spent lime to be disposed of, etc. Depending upon an evaluation of these variables, the ratio of soil to spent lime may vary anywhere from 9:1 to 1:9. Studies thus far indicate that optimum load bearing characteristics are achieved from fill consisting a roughly equal portions of soil and spent lime i.e. ratios between 3:2 to 2:3 depending of course upon the nature of the specific soil used.

Once properly intermixed, the composite fill material 22 is placed into the selected land area to create a solid soil base, as shown in FIG. 3. Typically, the selected land area 24 is a gravel pit or a depressed land area but the subject composite fill material 22 and method for filling may be used to build up land areas not previously depressed i.e. to build mounds or hills. A front-end loader 26 or other common machinery may be used to load and carry the composite fill 22 and deposit it at the selected location. Depending upon the final application of the filled land, it may be further necessary to compact the fill 22, while filling. That is, the composite fill material may be rolled with heavy rollers intermediately between adding loads of fill material, thus creating a denser solid soil base.

The subject composite fill material 22 is relatively inexpensive due to the inexpensive nature of spent lime. Generally there is an over abundance of spent lime at municipal water treatment facilities; thus the only cost involved is usually that associated with collecting the spent lime from settling ponds and trucking it to the land site. The resulting solid soil base created by the subject method is relatively impermeable to water and will not easily erode away. Moreover, depending upon the mix ratio of soil to spent lime, the resulting solid soil base may be specifically designed to exhibit sufficient load bearing characteristics to support land uses ranging from city parks to commercial buildings.

The invention has been described in an illustrative manner and it is to be understood that the terminology which has been used is intended to be in the nature of words of description rather than of limitation.

Obviously many modifications and variations of the present invention are possible in light of the above teachings. It is therefore, to be understood that within the scope of the appended claims wherein reference numerals are merely for convenience and are not to be in any way limiting. The invention may be practiced otherwise than as specifically described.

What is claimed is:

1. A method for filling land areas including the steps of:

generating a substance consisting essentially of spent lime (14) which is substantially non-reactive and will not absorb an appreciable amount of water;

intermixing said substance consisting essentially of substantially non-reactive spent lime (14) with soil (18) to form a substantially non-reactive composite fill material (22); and filling a land area (24) with the composite fill material (22) to create a solid soil base.

2. A method as set forth in claim 1 further characterized by selecting spent lime (14) including substantially calcium carbonate, $CaCO_3$.

3. A method as set forth in claims 1 or 2 wherein the step of generating spent lime (14) is further characterized by adding lime to water (12) in order to precipitate out minerals causing water hardness and form the spent lime as a precipitate of lime and minerals.

4. A method as set forth in claim 3 further characterized by intermixing the spent lime (14) with soil (18) while the spent lime (14) is wet.

5. A method as set forth in claim 4 further characterized by collecting spent lime (14) from water softening facilities.

6. A method as set forth in claim 5 further characterized by testing the spent lime (14) for unacceptable amounts of hazardous materials.

7. A method as set forth in claim 5 further characterized by the steps of draining a settling pond containing spent lime therein and removing the spent lime from the settling pond.

8. A method as set forth in claim 7 further characterized by transporting the spent lime from the settling pond to a land area to be filled.

* * * * *